(12) United States Patent
Sun (10) Patent No.: US 9,385,779 B2
(45) Date of Patent: Jul. 5, 2016

(54) ACOUSTIC ECHO CONTROL FOR AUTOMATED SPEAKER TRACKING SYSTEMS (71) Applicant: CISCO TECHNOLOGY, INC., San Jose, CA (US)

(72) Inventor: Haohai Sun, Sandvika (NO)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/098,064

(22) Filed: Dec. 5, 2013

(65) Prior Publication Data

US 2015/0110282 A1    Apr. 23, 2015

Related U.S. Application Data (60) Provisional application No. 61/893,640, filed on Oct. 21, 2013.

(51) Int. Cl.
*H04B 3/20* (2006.01)
*H04R 29/00* (2006.01)
(Continued)

(52) U.S. Cl.
CPC ........ *H04B 3/23* (2013.01); *G10L 25/51* (2013.01); *H04N 7/15* (2013.01); *H04R 3/005* (2013.01); *G10L 2021/02082* (2013.01)

(58) Field of Classification Search
CPC ......... H04N 7/15; H04N 7/147; H04R 3/005; H04R 1/406; H04L 65/403; G10L 2021/02082; G10L 25/51; H04B 3/23
USPC .............. 381/66, 92; 348/14.08, 14.12, 14.07
See application file for complete search history.

(56) References Cited

U.S. PATENT DOCUMENTS 5,463,618 A * 10/1995 Furukawa et al. ............ 370/290
6,434,110 B1    8/2002 Hemkumar
(Continued)

FOREIGN PATENT DOCUMENTS

EP    1633121 B1    11/2008
EP    2388996 A2    11/2011
(Continued)

OTHER PUBLICATIONS

International Search Report and Written Opinion, from PCT/US2014/059409, Jan. 29, 2015, WO.
(Continued)

*Primary Examiner* — Khai N Nguyen
(74) *Attorney, Agent, or Firm* — Lempia Summerfield Katz LLC (57) ABSTRACT

A processing system can include a tracking microphone array; audio tracker circuitry connected to the tracking microphone array to track an audio source based on an audio input from the array; communication microphones; and a processor. The processor can include audio circuitry to receive an audio input from the communication microphones and process the audio input to apply one or more of acoustic echo cancellation (AEC) and acoustic echo suppression (AES) processing to the audio input. The processor can further include calculating circuitry to calculate a ratio of signal power after and before the AEC and/or the AES processing, and control circuitry to generate an acoustic echo presence indication based on the ratio calculated by the calculating circuitry. The processor can transmit, via transmitting circuitry, the acoustic echo presence indication to an audio tracking device via a data communication channel between the processor and the audio tracker.

20 Claims, 5 Drawing Sheets (51) Int. Cl.
*A61F 11/06* (2006.01)
*G10K 11/16* (2006.01)
*H03B 29/00* (2006.01)
*H04R 3/00* (2006.01)
*H04B 3/23* (2006.01)
*G10L 25/51* (2013.01)
*H04N 7/15* (2006.01)
*G10L 21/0208* (2013.01)

(56) References Cited

U.S. PATENT DOCUMENTS

| | | | | |
|---|---|---|---|---|
| 6,553,122 | B1* | 4/2003 | Shimauchi | H04M 9/082 379/406.08 |
| 6,611,601 | B2* | 8/2003 | Terada | H04M 9/082 379/406.01 |
| 7,315,619 | B2 | 1/2008 | Marton et al. | |
| 7,586,513 | B2 | 9/2009 | Muren et al. | |
| 8,311,234 | B2* | 11/2012 | Sakuraba | H04M 9/082 379/406.14 |
| 8,395,653 | B2 | 3/2013 | Feng et al. | |
| 8,538,749 | B2* | 9/2013 | Visser | G10L 21/02 704/200 |
| 8,818,175 | B2* | 8/2014 | Dubin | H04N 7/155 386/262 |
| 8,842,851 | B2* | 9/2014 | Beaucoup | H04R 3/005 381/122 |
| 2002/0126855 | A1* | 9/2002 | Terada | H04M 9/082 381/93 |
| 2005/0047611 | A1 | 3/2005 | Mao | |
| 2006/0239443 | A1* | 10/2006 | Oxford et al. | 379/406.01 |
| 2008/0112568 | A1* | 5/2008 | Sakuraba | H04M 9/082 381/66 |
| 2010/0017205 | A1* | 1/2010 | Visser | G10L 21/02 704/225 |
| 2010/0150360 | A1* | 6/2010 | Beaucoup | H04R 3/005 381/58 |
| 2010/0324890 | A1 | 12/2010 | Adeney | |
| 2011/0176687 | A1 | 7/2011 | Birkenes | |
| 2013/0044893 | A1 | 2/2013 | Mauchly et al. | |
| 2015/0086005 | A1* | 3/2015 | Kechichian et al. | 379/392.01 |

FOREIGN PATENT DOCUMENTS

| | | |
|---|---|---|
| WO | WO2010073212 A2 | 7/2010 |
| WO | WO 2013/025373 A1 | 2/2013 |
| WO | WO2013147901 A1 | 10/2013 |

OTHER PUBLICATIONS

U.S. Appl. No. 14/098,064, filed Dec. 5, 2013, Sun.
Sondhi, "An Adaptive Echo Canceller," The Bell System Technical Journal, vol. XLVI, No. 3, pp. 497-511, Mar. 1997.
Faller and Chen, "Supressing Acoustic Echo in a Spectral Envelope Space," IEEE Transactions on Speech and Audio Processing, vol. 5, No. 13, 15 pages, Sep. 2005.
Avendano, "Acoustic Echo Suppression in the STFT Domain," Proceedings of IEEE Workshop on Application of Signal Processing to Audio and Acoustics, pp. 175-178, Oct. 2001.
Sony Tracking Camera (PCSA-CTG70/CTG70P), Video Communication System—Technical Documentation, 10 pages, Oct. 2007.
Polycom, Manual for Setting up the Polycom EagleEye Director Camera, 3 pages, 2011.

* cited by examiner

Fig. 1
Conventional Example

ACOUSTIC ECHO CONTROL FOR AUTOMATED SPEAKER TRACKING SYSTEMS

TECHNICAL FIELD

This application relates generally to speaker tracking systems and acoustic echo control.

BACKGROUND

In typical speaker tracking systems, acoustic echo control is performed based on audio output (i.e., an audio output return) that is output to speakers.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

According to exemplary implementations, a processor can include: audio circuitry configured to receive an audio input from communication microphones and process the audio input to apply one or more of acoustic echo cancellation (AEC) and acoustic echo suppression (AES) processing to the audio input; calculating circuitry configured to calculate a ratio of signal power after and before the AEC and/or the AES processing; control circuitry configured to generate an acoustic echo presence indication based on the ratio calculated by the calculating circuitry; and transmitting circuitry configured to transmit the acoustic echo presence indication to an audio tracking device.

The calculating circuitry can be further configured to compare a value of the ratio to a predefined threshold value, and the control circuitry can be configured to generate the acoustic echo presence indication and transmit the acoustic echo presence indication to the audio tracking device based on the value of the ratio relative to the predefined threshold value.

The predefined threshold value can be 0.9, where a ratio value above 0.9 indicates nominal, insignificant or no acoustic echo, and a ratio value at or below 0.9 indicates strong echo. The predefined threshold value can also be about or approximately 0.9, within a range of 0.9+/−1, 2, 3, 4, or 5% and any intervening values, or within a range of 0.9+/−0.1, 0.2, 0.3, 0.4, or 0.5. The predefined threshold value can also be about or approximately 0.80, 0.81, 0.82, 083, 0.84, 0.85, 0.86, 0.87, 0.88, 0.90, 0.91, 0.92, 0.93, 0.94, 0.95, 0.96, 0.97, 0.98, or 0.99 within a range of 0.1, 0.5, 1, 2, 3, 4, or 5% (as relevant to a value up to 1) and any intervening values, or within a range of 0.1, 0.2, 0.3, 0.4, or 0.5 (as relevant to a value up to 1) of the approximate value.

The predefined threshold value can further be any value satisfying the following ranges: $0.8 \leq$ Threshold Value $\leq 0.9$; $0.75 \leq$ Threshold Value $\leq 0.95$; $0.85 \leq$ Threshold Value $\leq 0.95$; $0.88 \leq$ Threshold Value $\leq 0.9$; $0.9 \leq$ Threshold Value $\leq 0.92$; $0.89 \leq$ Threshold Value $\leq 0.91$; $0.85 \leq$ Threshold Value $\leq 0.9$; $0.8 <$ Threshold Value $< 0.9$; $0.75 <$ Threshold Value $< 0.95$; $0.85 <$ Threshold Value $< 0.95$; $0.88 <$ Threshold Value $< 0.9$; $0.9 <$ Threshold Value $< 0.92$; $0.89 <$ Threshold Value $< 0.91$; or $0.85 \leq$ Threshold Value $\leq 0.9$.

The calculating circuitry can be configured to calculate the ratio for a full-band signal for each time frame.

The calculating circuitry can be configured to calculate the ratio for many narrowband signals for each time frame.

The calculating circuitry can be configured to calculate the ratio for many frequency bins in a short-time Fourier transform domain.

The acoustic echo indication can include information to identify an acoustic echo corresponding to the acoustic echo indication.

The information can include a flag to identify a full-band signal and presence of the acoustic echo.

The information can include many flags to respectively identify different narrowband signals or frequency bins and respective presence of the acoustic echo.

The information can include a value of the ratio.

The information can include data that indicates one or more of how the ratio was computed, a duration of a time frame, and a full-band or narrowband that includes the echo.

The processor can further include receiving circuitry configured to receive responsive data from the audio tracking device based on source tracking results of the audio tracking device.

The processor can further include one or more actuators to actuate a camera or a microphone connected to the processor, where the responsive data includes actuator commands or indicators for the processor to utilize in actuating the camera or the microphone to direct the camera or the microphone towards an audio source.

The responsive data can include a position of an audio source, and the processor includes video circuitry configured to identify the audio source based on the responsive data.

A processing system can include: a tracking microphone array; audio tracker circuitry connected to the tracking microphone array and configured to track an audio source based on an audio input from the tracking microphone array; communication microphones; and a processor, such as the processor discussed above and herein.

The processing system can further include loudspeakers connected to audio output circuitry of the processor, wherein the audio tracker circuitry does not receive an audio output return from the audio output circuitry of the processor.

The processing system can further include network circuitry configured to interface with other processing systems via a network to establish and execute a conference between the processing systems.

The processing system can further include video circuitry to capture video from cameras and code/decode video.

A method can include receiving, by audio circuitry, an audio input from communication microphones; processing, by audio circuitry, the audio input to apply one or more of acoustic echo cancellation (AEC) and acoustic echo suppression (AES) processing to the audio input; calculating, by calculating circuitry, a ratio of signal power after and before the AEC and/or the AES processing; generating, by control circuitry, an acoustic echo presence indication based on the ratio calculated in the calculating; and transmitting, by transmitting circuitry, the acoustic echo presence indication to an audio tracking device.

A non-transitory computer-readable medium including computer-executable instructions that, when executed by computer processor, causes the computer processor to execute the method. Steps of the method or a corresponding computer process can be executed by various means, including encoding, converting, decoding, processing, transmitting, and receiving means that correspond to computer hardware components or computer hardware components that are configured by computer software or computer code.

DETAILED DESCRIPTION OF EXEMPLARY IMPLEMENTATIONS

In the drawings, like reference numerals designate identical or corresponding parts throughout the several views. Further, as used herein, the words "a," "an" and the like generally carry a meaning of "one or more," unless stated otherwise.

Aspects of this disclosure relate to video conferencing systems and telepresence systems. However, the teachings of this disclosure are not limited to such systems.

Video conferencing and telepresence systems may include a codec. A codec is coder-decoder that processes data, especially digital data. In the case of video conference and telepresence system, the codec codes and decodes audio and video data. Raw audio and video data may include digital or analog signals. The codec can process or code the analog signals into digital signals.

Figure 1:
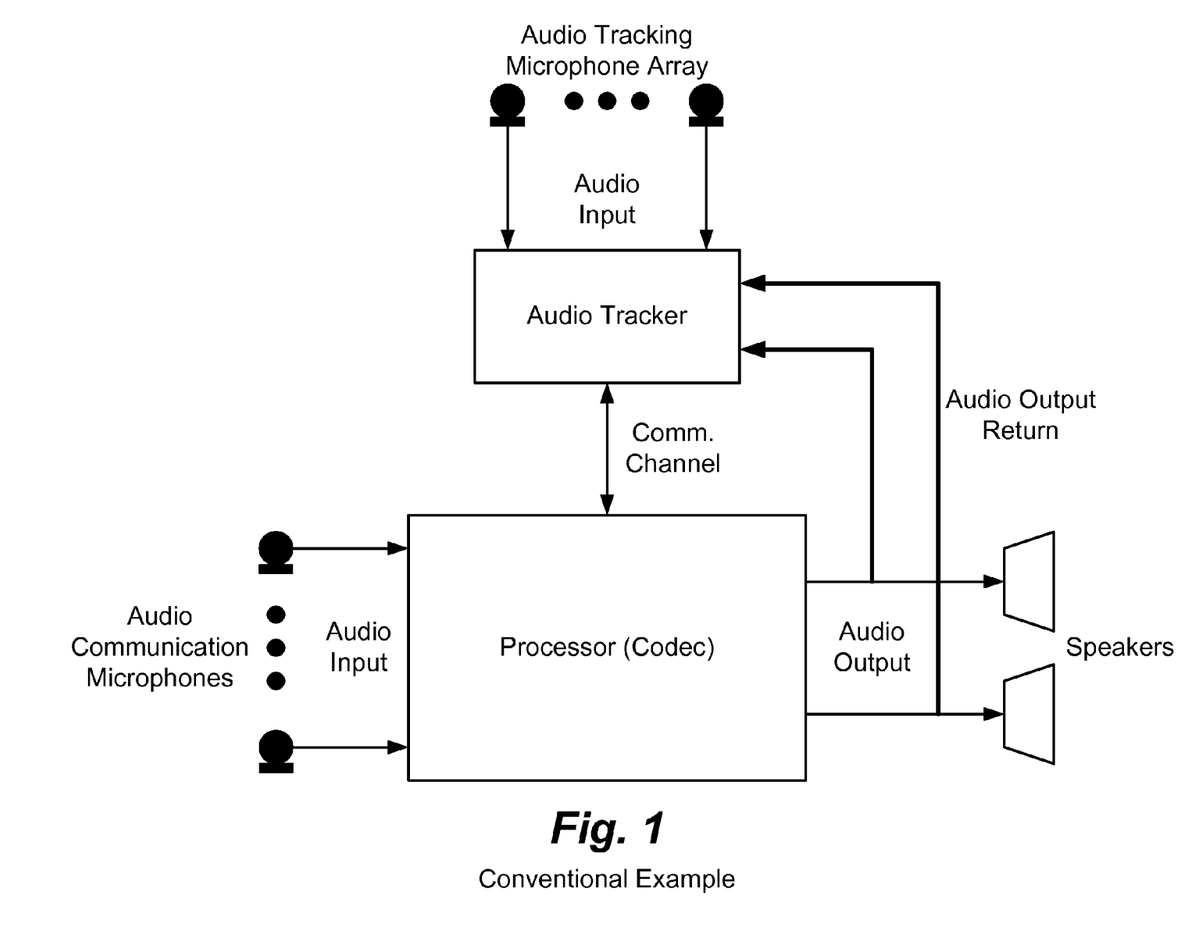
FIG. 1 is a schematic illustration of a conventional hardware arrangement to perform audio tracking.

In FIG. 1, which is exemplary of a conventional hardware arrangement, a codec is connected by a communication channel (e.g., a digital data communication channel) to an audio tracker. The codec can also be connected to a plurality of audio communication microphones, which are intended to be used for relaying speech or audio in a video conference, and a plurality of loudspeakers (may be referred to simply as speakers) for outputting audio from a direct source such as the audio communication microphones or from a remote location. The codec can also be connected to a plurality of cameras and monitor displays, not shown.

An audio tracker includes an audio processor that executes an algorithm to track a speaker utilizing a microphone array. In FIG. 1, an audio tracker receives audio input from an audio tracking microphone array. The array includes a plurality of microphones.

U.S. Pat. No. 8,395,653, filed Mar. 12, 2013, which is incorporated herein by reference, describes an audio processor, which can be a digital signal processor (DSP), which captures audio from a microphone array and performs audio processing, including echo cancelation, audio filtering, and source tracking. The audio processor also handles rules for switching between camera views, for detecting conversational patterns, and other purposes described therein.

U.S. Pat. No. 7,586,513, filed Apr. 7, 2004, which is incorporated herein by reference, describes an exemplary audio source tracking system and algorithm that utilizes a microphone array to track a source. Aspects of this disclosure can utilize such an audio source tracking algorithm and hardware or other algorithm/hardware combinations.

A speaker tracking system can automatically locate and zoom in on active speakers in the near-end using audio and face tracking techniques. A microphone array combined with an audio tracking algorithm, in one implementation, is employed to estimate a position of active speakers.

When participants in the far-end start talking or make noise, these sounds will be played back by near-end loudspeakers and captured by the aforementioned near-end microphone array. Such acoustic coupling between loudspeakers and microphones is called acoustic echo.

If the acoustic echo cannot be effectively controlled/removed, then the audio tracker may treat acoustic echo as near-end speech signals, and send wrong results to the speaker tracking system, which will lead to zooming in an incorrect speaker. Such problems compromise the quality of a video meeting. For example, when speaker volume is high or when a tracking camera is set up near a speaker, the tracking camera may aim toward the speaker by error.

Removal of unwanted acoustic echo (acoustic echo cancellation/suppression) is preferred and can be considered ideal for natural speech/audio communication in teleconferencing or video conferencing systems.

In acoustic echo cancellation (AEC), echo paths are modeled using adaptive filters. Echo is estimated by convolving estimated echo paths with reference signals (the signals played back by speakers). Then, echo is canceled by subtracting the estimated echo from the microphone signal. The above approach may break down in the presence of phase variations in the echo path, which typically occur during teleconferencing with personal computers. As a solution, acoustic echo suppression (AES) methods have been utilized to remove echo by using spectral subtraction. The intent is to achieve robustness through estimation of the spectral magnitude of the echo signal while ignoring the phase.

One implementation to handle acoustic echo in audio tracking systems is to transfer echo reference signals (signals played back by speakers) to the audio tracking module/system. Then, acoustic echo control methods are utilized to either remove the echo from multiple microphone signals or use the estimated signal-to-echo ratio to control the audio tracking algorithm. A conventional example of such a system is illustrated in FIG. 1. Here, the audio output return can be a separate output from the processor or part of a shared output from the processor to the speakers.

In video conferencing applications, a speaker tracker is usually jointly used with a video conferencing codec. In order to obtain the reference signals, extra audio cables are required to connect the codec's audio output channels to the speaker tracker, as seen in FIG. 1. These connections are necessary for the tracker's robustness, but increase complexity.

Robust acoustic echo estimation and cancellation is not a trivial task. Implementing a suitable AEC/AES in a speaker tracking system with multiple microphones can significantly increase the computational complexity of the tracking system.

According to aspects and teachings of this disclosure, acoustic echo presence indications are generated in a processor (e.g., a codec), and these indications are sent to an audio tracker (sometimes referred to as a speaker tracking system or source tracker) via a communication channel. The audio tracker uses these indications to achieve audio tracking with robustness against acoustic echo issues.

The acoustic echo presence indications are data computed by using microphones connected to the processor (e.g., the codec) and a ratio of signal power after and before echo canceller/suppressors in the codec.

Various advantages can be achieved according to exemplary implementations of this disclosure, including: simpler and fewer cable connections between an audio tracker and a codec; lower signal processing power consumption in the DSP for the audio tracker; lower hardware costs; and codecs/clients can provide very robust acoustic echo estimation and indication results to the audio tracker because the echo canceller/suppressor in the codec/client is relatively more sophisticated.

Figure 2:
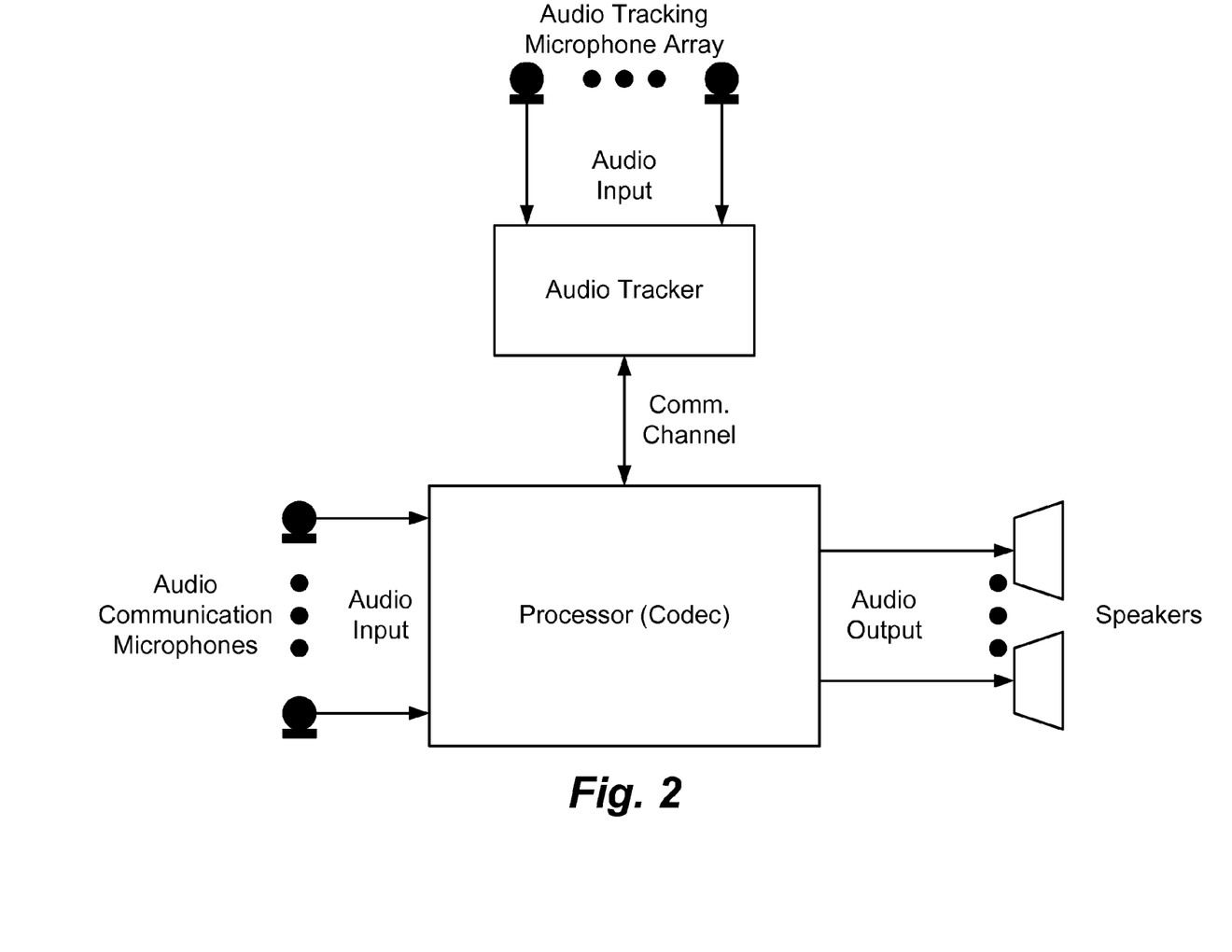
FIG. 2 is a schematic illustration of another hardware arrangement to perform audio tracking.

FIG. 2 is a schematic illustration of hardware to perform audio tracking according to an exemplary implementation.

In video conferencing applications, such as an exemplary room-based video conferencing application, a speaker tracker can be connected to a video conferencing codec (e.g., a CISCO® C60, C90, etc. manufactured by CISCO®), which has integrated AEC/AES solutions. Generally, in order to improve audio communication qualities, several conferencing microphones, as per FIGS. 1 and 2, are connected to the codec and distributed in the room. A codec with several distributed microphones can very accurately detect acoustic echo present in the room.

In this example, compared to the example in FIG. 1, an extra AEC/AES module implemented in the speaker/audio tracker is redundant, and can increase the complexity of the systems (hardware connection, computational power, etc.). That is, this "extra" AEC/AES module is not included in some implementations or examples.

In the exemplary implementation of FIG. 2, a processor can generate acoustic echo presence indications, and send them to the speaker tracking system via a communication channel, without an audio return channel and without the use of an audio return channel. The speaker tracking system (i.e., the audio tracker) achieves audio tracking with robustness against acoustic echo issues based on these indications.

The indications can be obtained, for example, by computing a ratio of signal power after and before (i.e., after:before) the echo canceller/suppressor in the codec. The ratio can be computed for a full-band signal for each time frame or for many narrowband signals (e.g., frequency bins in short-time Fourier transform domain) for each time frame. The range of the ratio is from 0 to 1. The ratio is smaller than 1 when strong echo exists. A ratio close to 1 corresponds to cases of silence, only near-end talk, or double talk (i.e., near-end sound is significantly stronger than far-end sound for that time frame or frequency bin). A ratio close to 1 indicates nominal, insignificant or no echo.

The processor can determine whether significant echo exists by comparing the ratio to a predetermined value, and determine whether to transmit a corresponding echo presence indication based on the comparing. For example, when the ratio is lower than (or lower than or equal to) a threshold value of, e.g., 0.9, a corresponding echo presence indication can be sent. On the other hand, for example, when the ratio is higher than (or higher than or equal to) the threshold value of, e.g., 0.9, no echo presence indication is sent. The above values and ranges can be adjusted based on user preferences or initial configurations for a particular room setup. For example, an acoustics test can be performed in a room where a videoconference system is to be used or installed, sample audio signals can be transmitted from speakers, and a threshold value for echo presence can be determined for usage in subsequent videoconference. Also, default settings can be user-selected based on room dimensions or other room characteristics.

The predefined threshold value can also be about or approximately 0.9, within a range of 0.9+/−1, 2, 3, 4, or 5% and any intervening values, or within a range of 0.9+/−0.1, 0.2, 0.3, 0.4, or 0.5. The predefined threshold value can also be about or approximately 0.80, 0.81, 0.82, 083, 0.84, 0.85, 0.86, 0.87, 0.88, 0.90, 0.91, 0.92, 0.93, 0.94, 0.95, 0.96, 0.97, 0.98, or 0.99 within a range of 0.1, 0.5, 1, 2, 3, 4, or 5% (as relevant to a value up to 1) and any intervening values, or within a range of 0.1, 0.2, 0.3, 0.4, or 0.5 (as relevant to a value up to 1) of the approximate value.

The predefined threshold value can further be any value satisfying the following ranges: $0.8 \leq$ Threshold Value $\leq 0.9$; $0.75 \leq$ Threshold Value $\leq 0.95$; $0.85 \leq$ Threshold Value $\leq 0.95$; $0.88 \leq$ Threshold Value $\leq 0.9$; $0.9 \leq$ Threshold Value $\leq 0.92$; $0.89 \leq$ Threshold Value $\leq 0.91$; $0.85 \leq$ Threshold Value $\leq 0.9$; $0.8 <$ Threshold Value $< 0.9$; $0.75 <$ Threshold Value $< 0.95$; $0.85 <$ Threshold Value $< 0.95$; $0.88 <$ Threshold Value $< 0.9$; $0.9 <$ Threshold Value $< 0.92$; $0.89 <$ Threshold Value $< 0.91$; or $0.85 \leq$ Threshold Value $\leq 0.9$.

The audio tracker receives an echo presence indication from the processor when an echo is detected for one time frame (or for one frequency bin in one time frame), then the audio tracker removes or suppresses the corrupted data (either the whole frame or the corrupted frequency bins) in a processing buffer of the audio tracker. The indication includes information to identify the acoustic echo. For example, the indication can be a flag for the full-band signal (e.g., "1" represents echo presence and "0" represents no echo) or many flags for different narrowband signals/frequency bins, or can include a value of the ratio and information that indicates how the ratio was computed (e.g., for a full-band signal for each time frame, for many narrowband signals or frequency bins in short-time Fourier transform domain for each time frame, or on a different basis), a duration of the time frame, and/or a full-band or narrowband that includes the echo. Various combinations of the above can be utilized.

Exemplary implementations and experimental results are discussed below.

Example Scenario 1

When a far-end participant is talking and acoustic echo in a meeting room is captured by conference microphones, the ratio of signal power after and before the AEC/AES in the codec is smaller than (or smaller than or equal to) to threshold value of 0.9, and echo presence indications are transmitted to the audio tracker by the processor.

Example Scenario 2

When both the near-end and far-end are silent or a near-end participant is speaking and the far-end is silent, the ratio of signal power after and before the AEC/AES in the codec is very close to 1 or above the threshold value of 0.9 and the audio tracker will not receive any indications about echo presence from the processor.

Example Scenario 3

When both near-end and far-end participants are speaking at the same time (double talk), assuming that near-end and far-end speech signals are non-stationary and do not overlap completely over various frequency bins and time frames: the audio tracker will not get any echo presence indications or notifications from the processor when echo power is much weaker than near-end speech for certain frequency bins and time frames; and the audio tracker will receive echo presence indications or notifications from the processor when echo power is much stronger than near-end speech for certain frequency bins and time frames.

Example Scenario 4

The robustness of the proposed solution was also tested by changing conferencing microphone positions (distributed table microphones) in a regular meeting room. Experimental results show that the tracking performance in the presence of echo is satisfactory and fairly robust. In some extreme cases that all conferencing microphones are far way (more than 4 meters) from the tracking microphones, the indications for late echo tails may be missed sometimes. However, since late echo tails' duration time is very short and their power is usually very weak, they can be easily detected and neglected as instant and spatially random noise signals by an audio tracker or a speaker tracking director.

Figure 3:
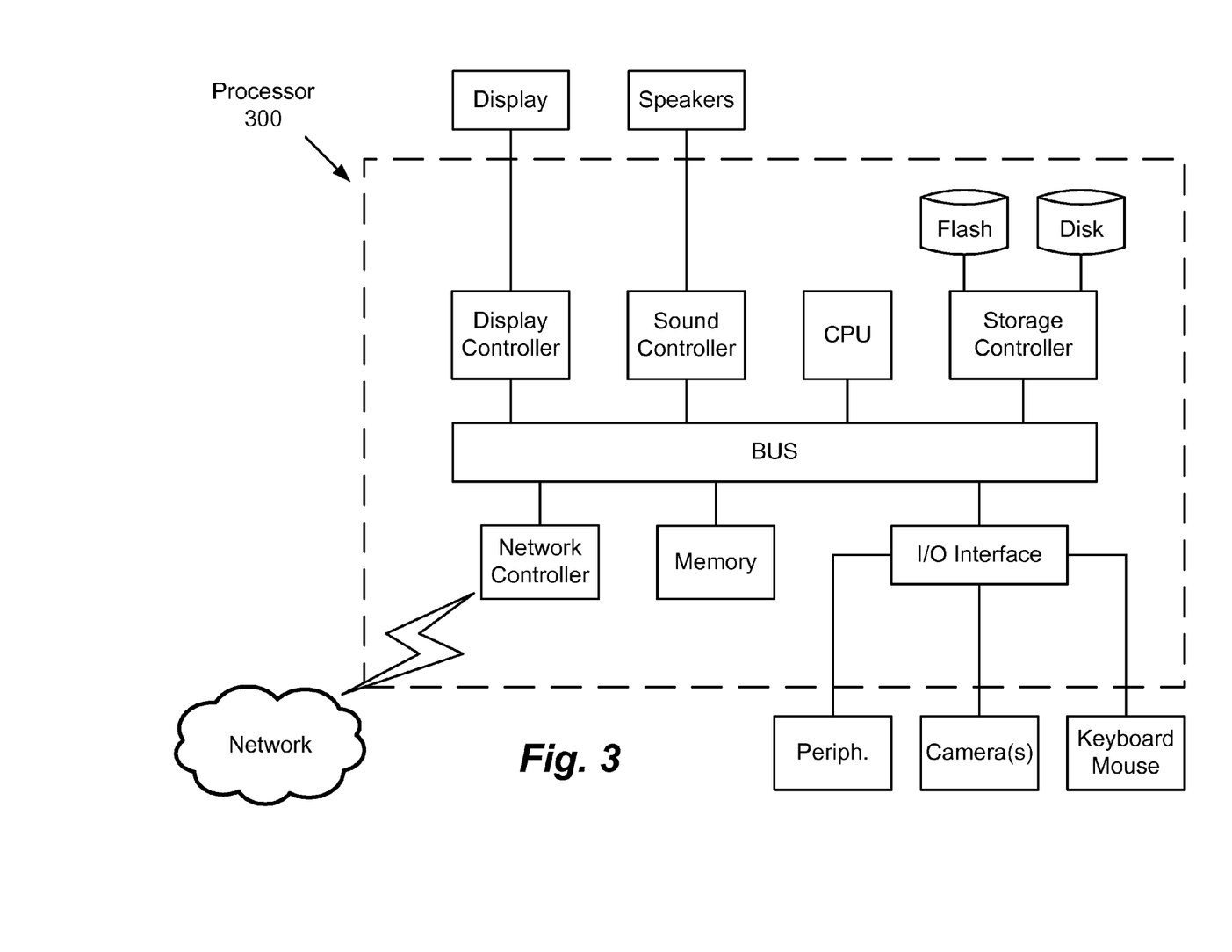
FIG. 3 is a schematic illustration of a processor.
Figure 4:
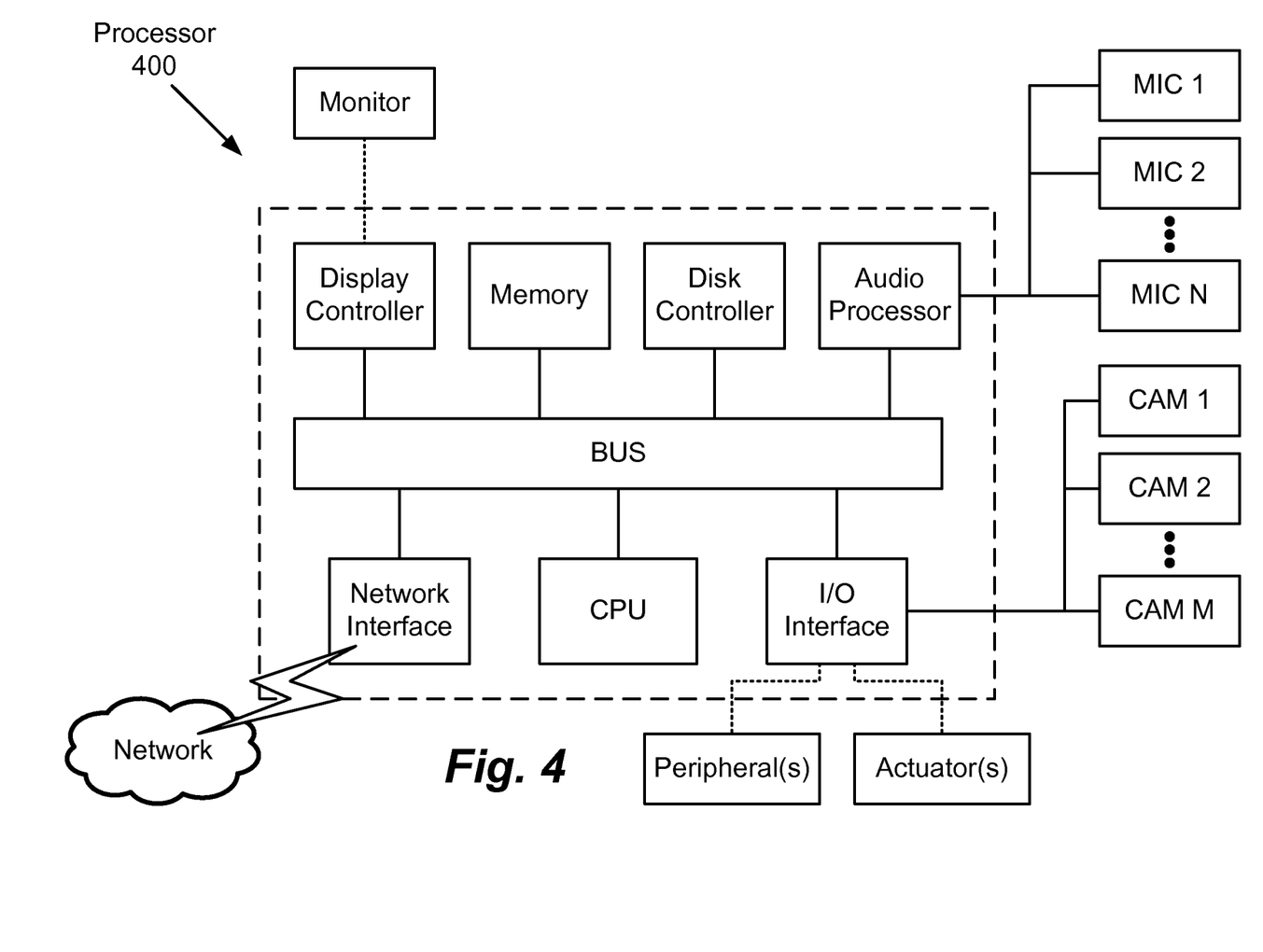
FIG. 4 is a schematic illustration of another processor.

Each of FIGS. 3 and 4 illustrates an exemplary processing system or processor 300/400. One or more of such processors can be utilized in or to execute one or more algorithms, or portions thereof, or one or more architecture blocks, or portions thereof, in accordance with the descriptions provided herein. For example, these processors illustrate computerized systems or circuits that implement the various algorithms and functions described herein. However, exemplary implementations may not include all of the hardware structures illustrated in these figures, as corresponding function may not be desired in all implementations.

The exemplary processors can be implemented using one or more microprocessors or the equivalent, such as a central processing unit (CPU), at least one application specific processor ASP (not shown), circuitry and/or one or more other circuits. The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can control a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

In FIG. 3, processor 300 can be embodied, in an exemplary implantation by a computer system of hardware architecture that has been modified by programming to execute the algorithms described herein. The processor 400 of FIG. 4 can be similarly embodied.

In one implementation, the processor 300 is separate from the processor 400. In another implementation, the processors 300 and 400 are integrated into a single machine. Further, aspects of the processors 300 and 400 can be distributed among a plurality of networked computer hardware components or circuits. In FIG. 4, the processor 400 is illustrated as connected to a plurality of microphones and cameras. These microphones can be grouped into two sets: one for audio tracking purposes to provide an audio tracking microphone array, consistent with that illustrated in FIG. 2; and another for audio communication purposes to provide audio communication microphones, consistent with that illustrated in FIG. 2. Although one audio processor is illustrated in FIG. 4, multiple audio processors can be provided, such as one or one group of processors dedicated for audio tracking and one or one group of processors dedicated for audio communication purposes.

Figure 5:
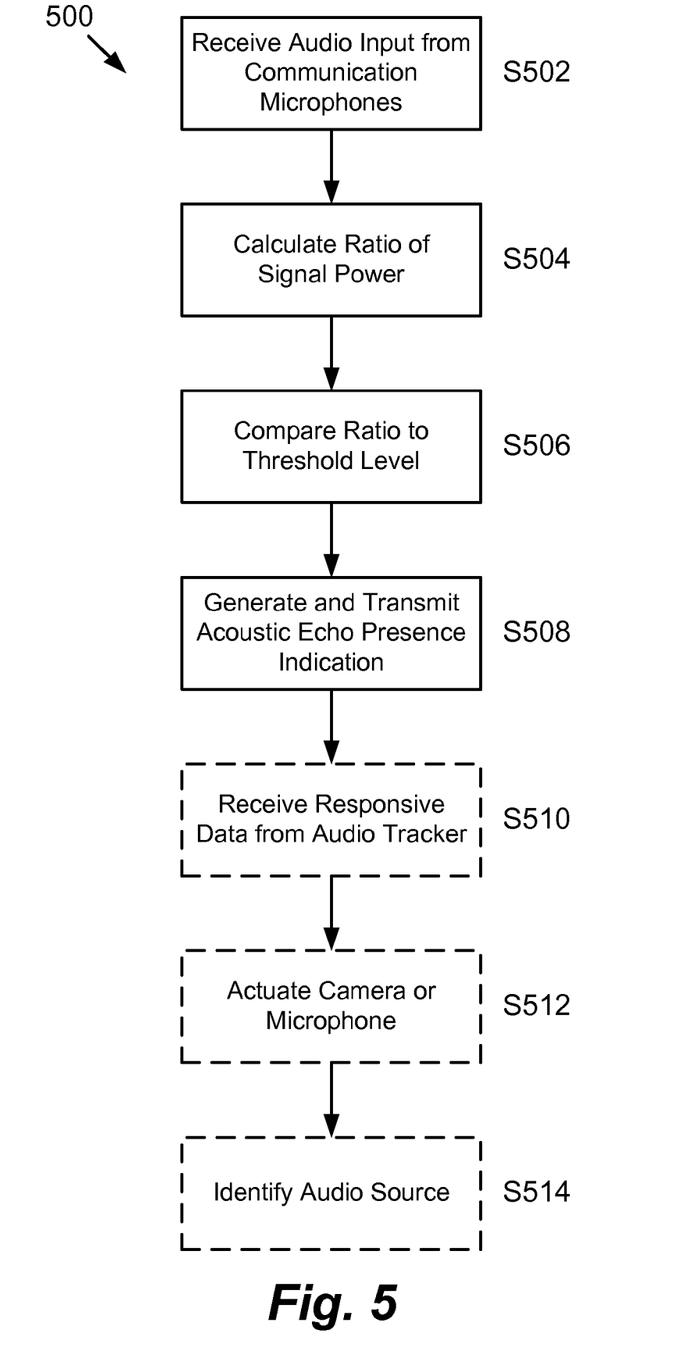
FIG. 5 is a flowchart illustration of an exemplary algorithm.

FIG. 5 illustrates an exemplary algorithm 500 for audio tracking by a processor, by way of flow charts, that correspond to the processing and hardware described via one or more of the exemplary processors illustrated in FIGS. 3-4.

In FIG. 5, a processor (e.g., a codec) receives audio input from communication microphones (e.g., conference microphones) at S502. At S504, the processor calculates a ratio of signal power in accordance with the above descriptions. At S506, the processor compares the calculated ratio to a threshold value to determine whether an acoustic echo presence indication should be generated. When the comparison results in an indication that the acoustic echo presence indication should be generated, the processor generates the indication and transmits the indication to an audio tracker at S508 via a communication channel. The audio tracker then executes audio tracking algorithms based on the acoustic echo presence indication, such that separately processing acoustic echo algorithms at the audio tracker are unnecessary, and such that receiving an audio output return is unnecessary. Based on processing results of the audio tracker, the audio tracker transmits responsive data to the processor at S510. The responsive data can include actuator commands or indicators for the processor to utilize in actuating camera or microphone actuators to direct cameras and/or microphones towards a speaker or an audio source at S512. The responsive data can also include a position of an audio source, which the processor utilizes in identifying the audio source at S514. When utilizing a videoconference system, the processor can highlight or otherwise visually identify the audio source in a video stream.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A processor, comprising:
audio circuitry configured to receive an audio input from communication microphones and process the audio input to apply one or more of acoustic echo cancellation (AEC) and acoustic echo suppression (AES) processing to the audio input;
calculating circuitry configured to calculate a ratio of signal power after and before the AEC or the AES processing;
control circuitry configured to generate an acoustic echo presence indication based on the ratio calculated by the calculating circuitry; and
transmitting circuitry configured to transmit the acoustic echo presence indication to an audio tracking device.

2. The processor according to claim 1, wherein:
the calculating circuitry is further configured to compare a value of the ratio to a predefined threshold value, and
the control circuitry is configured to generate the acoustic echo presence indication and transmit the acoustic echo presence indication to the audio tracking device based on the value of the ratio relative to the predefined threshold value.

3. The processor according to claim 2, wherein:
the predefined threshold value is about 0.9,
a ratio value above about 0.9 indicates nominal, insignificant or no acoustic echo, and
a ratio value at or below about 0.9 indicates strong echo.

4. The processor according to claim 1, wherein the calculating circuitry is configured to calculate the ratio for a full-band signal for each time frame.

5. The processor according to claim 1, wherein the calculating circuitry is configured to calculate the ratio for many narrowband signals for each time frame.

6. The processor according to claim 5, wherein the calculating circuitry is configured to calculate the ratio for a plurality of frequency bins in a short-time Fourier transform domain.

7. The processor according to claim 1, wherein the acoustic echo indication includes information to identify an acoustic echo corresponding to the acoustic echo indication.

8. The processor according to claim 7, wherein the information includes a flag to identify a full-band signal and presence of the acoustic echo.

9. The processor according to claim 7, wherein the information includes many flags to respectively identify different narrowband signals or frequency bins and respective presence of the acoustic echo.

10. The processor according to claim 7, wherein the information includes a value of the ratio.

11. The processor according to claim 7, wherein the information includes data that indicates one or more of how the ratio was computed, a duration of a time frame, and a full-band or narrowband that includes the echo.

12. The processor according to claim 1, further comprising:
receiving circuitry configured to receive responsive data from the audio tracking device based on source tracking results of the audio tracking device.

13. The processor according to claim 12, further comprising:
one or more actuators to actuate a camera or a microphone connected to the processor,
wherein the responsive data includes actuator commands or indicators for the processor to utilize in actuating the camera or the microphone to direct the camera or the microphone towards an audio source.

14. The processor according to claim 12, wherein the responsive data includes a position of an audio source, and the processor includes video circuitry configured to identify the audio source based on the responsive data.

15. The processor of claim 1, wherein the audio tracking device executes an audio tracking algorithm based on the acoustic echo presence indication.

16. A processing system, comprising:
a tracking microphone array;
audio tracker circuitry connected to the tracking microphone array and configured to track an audio source based on an audio input from the tracking microphone array;
communication microphones; and
a processor, including:
- audio circuitry configured to receive an audio input from the communication microphones and process the audio input to apply acoustic echo cancellation (AEC) or acoustic echo suppression (AES) processing to the audio input;
- calculating circuitry configured to calculate a ratio of signal power after and before the AEC or the AES processing;
- control circuitry configured to generate an acoustic echo presence indication based on the ratio calculated by the calculating circuitry; and
- transmitting circuitry configured to transmit the acoustic echo presence indication to an audio tracking device via a data communication channel between the processor and the audio tracker, wherein the audio tracker circuitry is configured to track the audio source based on acoustic echo presence indication.

17. The processing system according to claim 16, further comprising:
loudspeakers connected to audio output circuitry of the processor, wherein the audio tracker circuitry does not receive an audio output return from the audio output circuitry of the processor.

18. The processing system according to claim 16, further comprising:
network circuitry configured to interface with other processing systems via a network to establish and execute a conference between the processing systems.

19. The processing system according to claim 16, further comprising:
video circuitry to capture video from cameras and code/decode video.

20. A method, comprising:
receiving, by audio circuitry, an audio input from communication microphones;
processing, by audio circuitry, the audio input to apply acoustic echo cancellation (AEC) or acoustic echo suppression (AES) processing to the audio input;
calculating, by calculating circuitry, a ratio of signal power after and before the AEC or the AES processing;
generating, by control circuitry, an acoustic echo presence indication based on the ratio calculated in the calculating; and
transmitting, by transmitting circuitry, the acoustic echo presence indication to an audio tracking device, wherein the audio tracking device is operable to track the audio source based on acoustic echo presence indication.

* * * * *